Dec. 16, 1930.  S. F. KUMOR  1,785,633
AIRCRAFT
Filed March 20, 1929  3 Sheets-Sheet 1
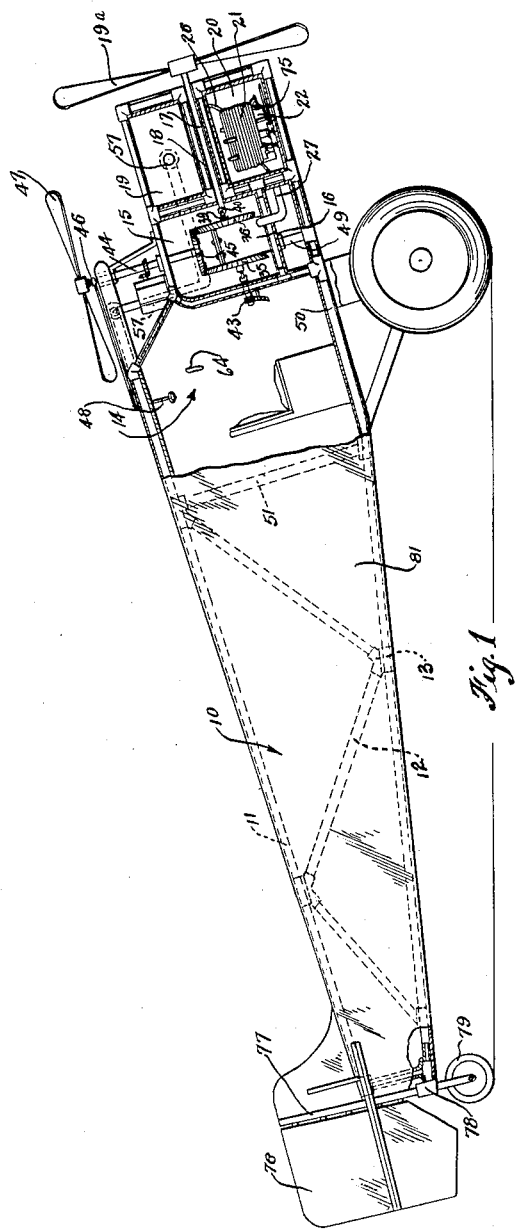
Stefan F. Kumor INVENTOR
BY Victor J. Evans
HIS ATTORNEY

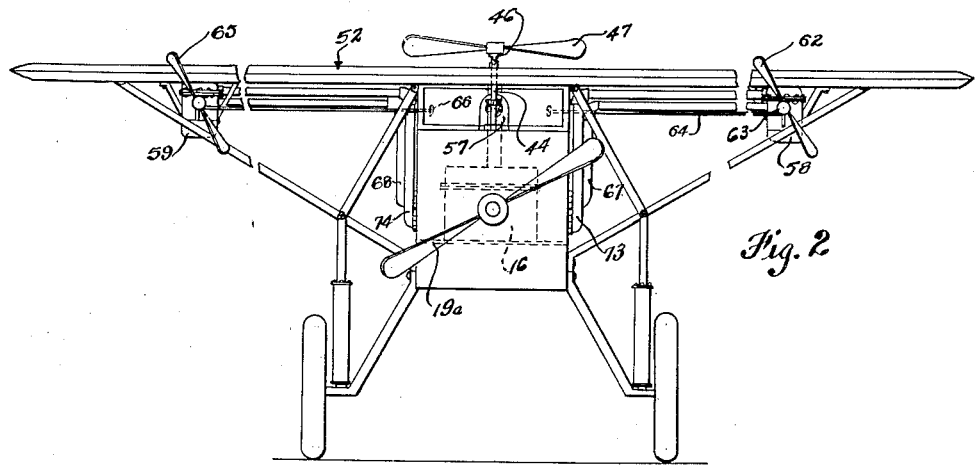
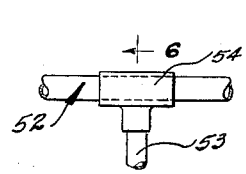
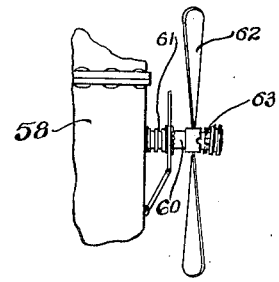
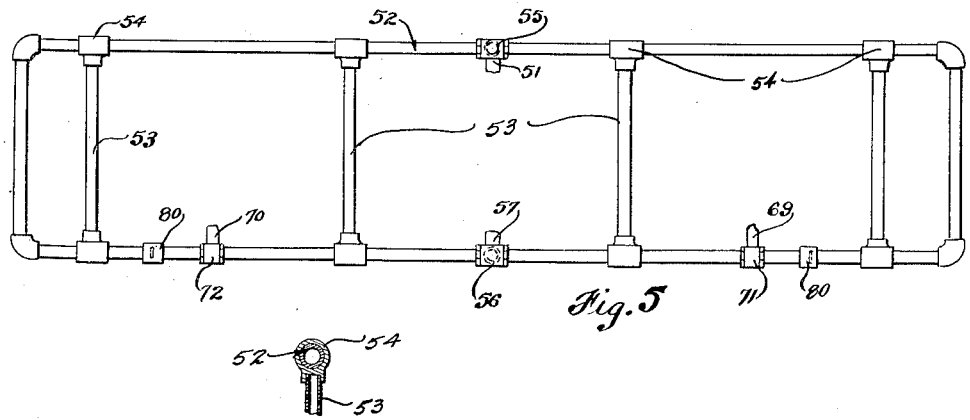

Dec. 16, 1930.  S. F. KUMOR  1,785,633
AIRCRAFT
Filed March 20, 1929   3 Sheets-Sheet 3

Stefan F. Kumor  INVENTOR
BY Victor J. Evans
HIS ATTORNEY

Patented Dec. 16, 1930

1,785,633

UNITED STATES PATENT OFFICE

STEFAN F. KUMOR, OF CHICAGO, ILLINOIS

AIRCRAFT

Application filed March 20, 1929. Serial No. 348,610.

This invention relates to certain novel improvements in aircrafts and has for its principal object the provision of an improved construction of this character which will be highly efficient in use and economical in manufacture.

The salient object of my invention is to provide an aircraft which will embody a frame that may be formed in a very economical manner and which will embody members that may be utilized in connection with the members which operate the aircraft.

Another object of the invention is to provide an aircraft in which fluid pressure operated motive means may be employed such as a steam turbine for operating the propellers.

Another object of the invention is to provide an aircraft in which internal combustion engines of the water cooled type for operating additional propellers may be provided.

A further object of the invention is to provide a connection between the water jackets of the internal combustion engines and the water system employed in the generation of steam to operate the turbine whereby the water heated in the cooling of the internal combustion engines may be more easily converted into steam.

Another object of the invention is to provide an arrangement whereby the main propeller may be operated in two directions.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a view partly in elevation and partly in section depicting a preferred form of construction for my invention;

Fig. 2 is a front elevational view of the device as depicted in Fig. 1;

Fig. 3 is a detail view depicting an arrangement employed in the frame construction;

Fig. 4 is a detail view depicting a clutch structure employed in the device;

Fig. 5 is a plan view depicting the frame construction employed for the wing;

Fig. 6 is a sectional detail view taken substantially on the line 6—6 on Fig. 3;

Figure 7:
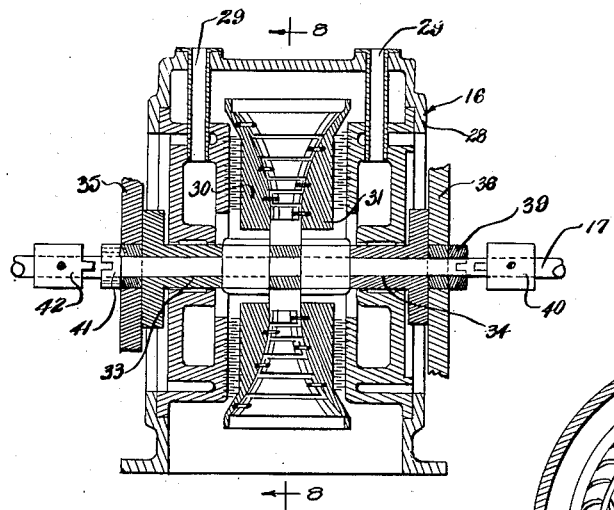
Fig. 7 is a longitudinal vertical sectional view of the turbine employed in my device.

In the accompanying drawings wherein I have illustrated a preferred form of construction for my invention 10 indicates a fuselage of an aircraft constructed in accordance with my invention. This fuselage is preferably rectangular in cross section and at the corners thereof the frame of my improved device is arranged which in the present instance is preferably formed from pipes indicated by 11. At suitable points in the extent of the pipes 11 bracing structures including the pipes 12 are arranged which are secured in fittings 13 to be described more fully hereinafter and in this manner the fuselage structure 10 is reenforced. Adjacent the forward end of the fuselage 10 is a compartment 14 in which the various control mechanisms employed in my device are arranged and which provides space in which the operator of the craft may travel. Forwardly of this operating compartment 14 are a plurality of compartments to be described hereinafter and the frame structure around these compartments is also formed from piping which is employed in a manner to be set forth hereinafter.

A compartment 15 is provided forwardly of the compartment 14 and in this compartment an operating mechanism such as a steam turbine 16 is arranged which will be described more fully hereinafter. The shaft 17 extends through the turbine structure 16 and into the compartment 14. A shaft 17 is also directed through a passage 18 and extends beyond the front end of the craft and a propeller 19a is mounted on this shaft 17 at the forward end thereof. Arranged above the passage 18 is a compartment 19 and arranged below the passage 18 is a compartment 20.

In the compartment 20 a suitable steam generating mechanism is provided which in the present instance comprises a boiler 21 which is preferably of the so-called tubular type in which a plurality of tubes are arranged in circular relation in superimposed positions so as to provide a relatively great area which will lie in the path of heat that will be supplied by the burner structure 22 which may be of any approved form it being understood that the boiler may also be constructed in any desired manner. In the present instance the burner 22 includes a mixing compartment 23 and the fuel jet 24 and operation of the burner is controlled by the valve 25. The compartment 19 serves as a water compartment and water is drawn therefrom through the pipe 26 into the boiler 21. The outlet pipe 27 of the boiler is directed to the turbine 16.

Figure 8:
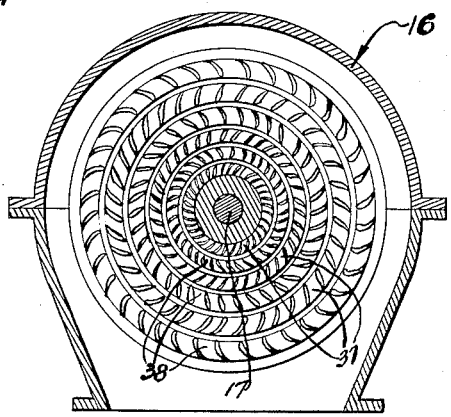
Fig. 8 is a sectional view taken substantially on the line 8—8 on Fig. 7.
Figure 9:
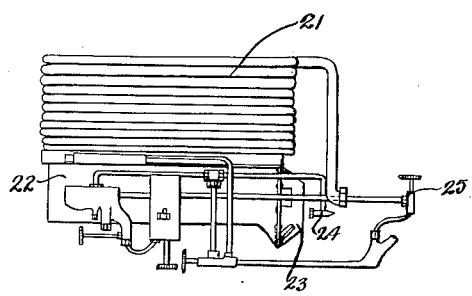
Fig. 9 is a detail view of the boiler employed in my device.

The turbine 16 is best illustrated in Figs. 7 and 8 and while any desired type of turbine may be employed it is preferable that the type depicted in these views be used. This turbine construction includes the stator structure 28 in which the steam passages 29 are defined which permit passage of the steam to the rotor structures. It has been pointed out that the shaft 17 extends through the turbine structure and this shaft is preferably arranged so as to be slidable relative to said structure. The rotors are indicated by 30 and 31 and are mounted so as to be freely rotatable on the shaft 17. The rotors include portions 33 and 34 and on these portions extraneous of the stator 28 I mount gears 35 and 36 which are utilized in the manner set forth hereinafter. The vanes 37 on the rotor 30 are all extended in one direction while the vanes 38 on the rotor 31 extends in the direction opposite to the vanes 37 and are arranged intermediate the rows of vanes 37. Therefore, the steam passing down through the inlets 29 will strike the first row of vanes 37 and act thereon in a manner well understood in the art to cause rotation of the rotor 30 and from this first row of vanes 37 it will pass into the first row of vanes 38 and will act to cause rotation of the rotor 31 and from these vanes it will pass into the next row of vanes 37 from which it will pass into the next row of vanes 38 and due to the opposite disposition of these vanes, the rotors 30 and 31 will be rotated in opposite directions.

It has been pointed out that the shaft 17 is slidable and this is utilized in the following manner. On the face of the gear 36 a clutch jaw 39 is mounted and a collar 40 is fixed on the shaft 17. The clutch jaw 39 in the present instance has suitable sockets formed therein while the collar 41 has lugs projecting therefrom. When the shaft 17 is moved so as to bring the lugs on the collar 40 into the sockets in the jaw 39 it is apparent that the shaft 17 will be connected to the rotor 31 for rotation in one direction which will cause operation of the propeller 19a. On the face of the gear 35 is a clutch jaw 41 and a collar 42 is fixed on the shaft 17 and this collar and jaw have co-operating lugs and sockets which are arranged such that when the shaft 17 is moved so as to cause engagement of this jaw and collar the shaft 17 will be operated in the direction opposite to that set forth which will obviously also operate the propeller 19a in the opposite direction. It is apparent that the clutch structures just described are oppositely disposed in a manner such that they may be either alternately engaged or arranged in a neutral position but are disposed such that both cannot be simultaneously engaged. The means for slidably moving the shaft 17 is disposed in the compartment 14 and is indicated by 43.

It is apparent from the foregoing description that when water is withdrawn from the compartment 19 and converted into steam in the boiler 21 from heat from the burner 22 it travels through the pipe 27 to the intakes 29 of the turbines which causes operation of the rotors therein which in turn act on the shaft 17 to rotate said shaft to cause operation of the propeller 19a.

It has been pointed out that gears 35 and 36 are provided on the outer faces of the turbine 16 and it has been shown that these gears rotate in opposite directions. A shaft 44 is journaled in the upper portions of the fuselage structure 10 and extends into the compartment 15 and has a gear 45 provided on the inner end thereof which meshes with the gears 35 and 36. Since these gears 35 and 36 mesh with opposite sides of the gear 45 it is apparent that they will co-operate in causing operation of the gear 45 which in turn will cause operation of the shaft 44. Therefore, this interconnection of the gears 35 and 36 to the gear 45 will interconnect the rotors so that they will operate at uniform speeds. A clutch structure 46 is provided in the shaft 44 which is arranged so that the shaft portions of the shaft 44 which extend beyond the upper side of the craft may be caused to operate or be rendered inoperative when so desired and a propeller 47 is mounted on this end of the shaft 44 which is employed during the lifting of the aircraft and after a predetermined height has been obtained by the operation of this propeller the clutch 46 is disengaged and, therefore, this propeller will be rendered inoperative and all the power generated by the turbine 16 will be imparted to the propeller 19a. The means for operating the clutch 46 are indicated by 48 and are extended into the compartment 14.

The outlet from the turbine 16 is indicated by 49 and is connected to a pipe 50 which extends below the compartment 14 at substantially the midpoint thereof and this pipe 50 is connected to a pipe 51 which extends vertically through the fuselage 10 behind the compartment 14 in alignment with the rear edge of the wing structure now to be described.

The wing structure is formed from pipes which are connected together so as to form a continuous structure as indicated generically by 52. Cross braces 53 are provided in this wing structure 52 which do not connect with the continuous pipe structure 52 and these bracing structures 53 are connected into suitable fittings 54 which will be described more fully hereinafter. The pipe 51 terminates in a T-connection 55 so that that discharge from the turbine will be passed into the pipe structure 52 and since this pipe structure 52 is arranged in the wing it is apparent that a relatively great area will be exposed to the moving air and, therefore, this pipe structure will serve as a condenser. Arranged in the pipe structure 52 opposite the T-connection 55 is a T-connection 56 to which a pipe 57 is connected that extends to the water compartment 19 and discharges the water of condensation from the steam introduced into the pipe structure 52 back into this water tank and it is, therefore, apparent that a complete circuit is provided for the water.

In addition to the turbine arrangement set forth I desire to employ internal combustion engines and these internal combustion engines are indicated by 58 and 59. On the shaft 60 of the internal combustion engine 58 I arrange a clutch structure 61 and a propeller 62. A spring 63 normally holds the propeller 62 in inoperative position but when the clutch structure 61 is operated the propeller 62 is connected to the shaft 60 through the clutch structure 61 and, therefore, this propeller wlil be operated when the internal combustion engine 58 is operated. An operating lever 64 is provided for the clutch structure 61 which extends into the compartment 14. The internal combustion engine 59 operates a propeller 65 and this propeller and internal combustion engine are interconnected in the same manner as that in which the propeller 62 and the internal combustion engine 58 are provided. An operating member 66 for the clutch structure associated with the propeller and internal combustion engine extends into the compartment 14. The clutch structures associated with these internal combustion engines permit the propellers associated therewith to be freely rotated when the craft is moved by the propeller 19a and when these propellers are rotated at a predetermined speed the clutch structures are engaged and, therefore, the action of the propellers will serve to start these motors. Pipe lines 67 and 68 extend between the water compartment 19 and the water jackets of the internal combustion engines so as to supply water thereto and the discharge pipes 69 and 70 from the water jackets of the engines 58 and 59 respectively terminate in T-connections 71 and 72 in the pipe structure 52 so that the water discharged from the water jackets of these engines will be mixed with the condensed water from the steam introduced into the pipe structure 52. The exhaust from the internal combustion engines 58 and 59 is directed through pipe structures 73 and 74 so as to discharge into the compartment 20 and this discharge will serve to effectively heat this compartment and aid the burner 22 in converting the water introduced into the boiler 21 into steam.

An outlet opening 75 is provided from the compartment 20 which opens into the pipe structure 11 and serves to conduct the heat from the compartment 20 around the frame of the fuselage so as to aid in heating the same and the discharge to this pipe structure 11 is arranged adjacent the tail of the craft as clearly illustrated in Fig. 1. It is to be understood that the wing structure and the fuselage are covered in the usual manner preferably with a light metal and it is to be further understood that the usual ailerons, rudders and elevators are associated with the craft and are operated from the compartment 14 in the manner well understood in the art.

At the rear end of the fuselage 10 the rudder 76 is mounted and in the present instance this rudder 76 is fixed on a shaft 77 which is journaled in a bearing 78 provided by the pipe structure 11 and at the lower end of the shaft 77 a wheel 79 is provided which is intended to support the rear end of the craft when the same is on the ground and it is apparent that by operating the rudder operating mechanism this wheel 79 will also be turned and thus the craft may be very expeditiously guided when on the ground.

Suitable check valves such as 80 are provided in the piping system at advantageous points for a purpose well understood in the art.

The fittings 13 and 54 which have been set forth hereintofore are arranged in the manner best illustrated in Figs. 3 and 6. By referring to these views it may be seen that when the pipe structures 52 or the pipe structures 11 are freely extended through portions of these fittings while the brace rods 12 or 53 are screw threadedly attached into these fittings and it is to be understood that any shape of fitting might be employed dependent upon the arrangement of the bracing structure.

To the rear of the compartment 14 in the fuselage 10 I provide a compartment 81 in which the fuel for the burner 22 and the motors 58 and 59 is stored.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In an aircraft, a fuselage having a plurality of compartments at the forward end thereof, steam generating means in one of said compartments, steam operated means in another of said compartments, a slidably mounted shaft, means for detachably connecting said shaft to said steam operated means, and a propeller on said shaft and operable therewith.

2. In an aircraft, a fuselage having a plurality of compartments at the forward end thereof, steam generating means in one of said compartments, steam operated means in another of said compartments, a slidably mounted shaft, means for detachably connecting said shaft to said steam operated means, a propeller on said shaft and operable therewith, and means operated by said steam operated means for actuating a horizontally disposed propeller associated with said fuselage.

3. In an aircraft, a fuselage and wing structure having the frames thereof formed from pipe, steam generating means in said aircraft, steam operated means in said aircraft, means for connecting the discharge from steam operated means to the pipes providing the frame for said wing structure whereby said pipe will serve as a condenser, and water cooled internal combustion engines having the water jackets thereof in circuit with said steam means.

4. In an aircraft, a fuselage and wing structure having the frames thereof formed from pipe, steam generating means in said aircraft, steam operated means in said aircraft, means for connecting the discharge from steam operated means to the pipes providing the frame for said wing structure whereby said pipe will serve as a condenser, and means for connecting the exhaust discharge from said internal combustion engines to said steam generating means and the pipe structure of said fuselage.

In testimony whereof I affix my signature.

STEFAN F. KUMOR.